United States Patent
Forstner et al.

(10) Patent No.: US 9,797,234 B1
(45) Date of Patent: Oct. 24, 2017

(54) REAL TIME UNTORQUING AND OVER-TORQUING OF DRILL STRING CONNECTIONS

(71) Applicants: Ingo Forstner, Ahnsbeck (DE); Kai Schoenborn, Lachendorf (DE); Ingo Roders, Seelze (DE)

(72) Inventors: Ingo Forstner, Ahnsbeck (DE); Kai Schoenborn, Lachendorf (DE); Ingo Roders, Seelze (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 15/257,215

(22) Filed: Sep. 6, 2016

(51) Int. Cl.
    *E21B 44/00* (2006.01)
    *E21B 17/00* (2006.01)
    (Continued)

(52) U.S. Cl.
    CPC .............. *E21B 44/00* (2013.01); *E21B 17/00* (2013.01); *E21B 17/16* (2013.01); *E21B 7/061* (2013.01); *E21B 19/16* (2013.01); *E21B 19/165* (2013.01); *E21B 19/166* (2013.01); *E21B 31/00* (2013.01); *E21B 43/10* (2013.01); *E21B 47/12* (2013.01); *G01P 15/16* (2013.01)

(58) Field of Classification Search
    CPC .......... E21B 44/00; E21B 17/00; E21B 17/16; E21B 7/061; E21B 31/00; E21B 43/10; E21B 47/12; E21B 19/16; E21B 19/165; E21B 19/166; G01P 15/16
See application file for complete search history.

(56) References Cited

U.S. PATENT DOCUMENTS 4,399,877 A    8/1983   Jackson et al.
4,561,299 A   12/1985   Orlando et al.
(Continued)

OTHER PUBLICATIONS

Johnson, et al.; "Landing the Big On-The Art of Fishing"; 2013; Retrieved from the internet http://www.slb.com/-/media/Files/resources/oilfield_reviewes/ors12/win12/3_fish_art.pdf; 10 pages.
(Continued)

*Primary Examiner* — Hai Phan
*Assistant Examiner* — Franklin Balseca
(74) *Attorney, Agent, or Firm* — Cantor Colburn LLP

(57) ABSTRACT

An apparatus for detecting over-torquing or un-torquing of a threaded connection between components in a borehole penetrating the earth includes: a string of components coupled in series by a threaded connection; a transmission line attached to each component; a signal coupler in communication with the transmission line and disposed on each component at each threaded connection, the signal coupler being configured to transmit the signal to an adjacent signal coupler on an adjacent coupled component in order to transmit a signal along the transmission line attached to the adjacent coupled component; a receiver configured to receive the signal; and a processor in communication with the receiver and configured to: (i) determine a difference between a characteristic of the signal and the characteristic of a reference signal and (ii) transmit an alert signal signifying that the threaded connection is over-torquing or un-torquing in response to the difference exceeding a threshold value.

20 Claims, 4 Drawing Sheets

(51) Int. Cl.
*E21B 17/16* (2006.01)
*E21B 47/12* (2012.01)
*E21B 7/06* (2006.01)
*E21B 31/00* (2006.01)
*E21B 43/10* (2006.01)
*E21B 19/16* (2006.01)
*G01P 15/16* (2013.01)

(56) References Cited

U.S. PATENT DOCUMENTS

| | | |
|---|---|---|
| 4,667,389 A | 5/1987 | Hasha |
| 4,683,944 A | 8/1987 | Curlett |
| 4,788,544 A | 11/1988 | Howard |
| 5,461,905 A | 10/1995 | Penisson |
| 5,465,799 A | 11/1995 | Ho |
| 5,476,014 A | 12/1995 | Lampe et al. |
| 6,212,763 B1 | 4/2001 | Newman |
| 6,546,815 B2 | 8/2003 | Yamada et al. |
| 7,565,844 B2 | 7/2009 | Crass et al. |
| 7,646,310 B2 | 1/2010 | Close |
| 7,882,902 B2 | 2/2011 | Boutwell, Jr. |
| 2004/0174163 A1 | 9/2004 | Rogers et al. |
| 2005/0046591 A1* | 3/2005 | Pacault ............ E21B 47/12 340/855.2 |
| 2013/0319768 A1* | 12/2013 | Madhavan ........ E21B 17/028 175/50 |
| 2014/0022088 A1 | 1/2014 | Chau et al. |

OTHER PUBLICATIONS

Knight, et al.; "Controlled Failure Design of Drillstring Threaded Connections"; Oct. 2003; Fatigue & Fracture of Engineering Materials & Structures, 26: 1081-1090.

Shokir, E.M.; "A Novel PC Program For Drill String Failure Detection and Prevention Before and While Drilling Specially in New Areas"; Oil & Gas Business, 2004; Retrieved from the Internet http://www.ogbus.com/eng/; 14 pages.

* cited by examiner

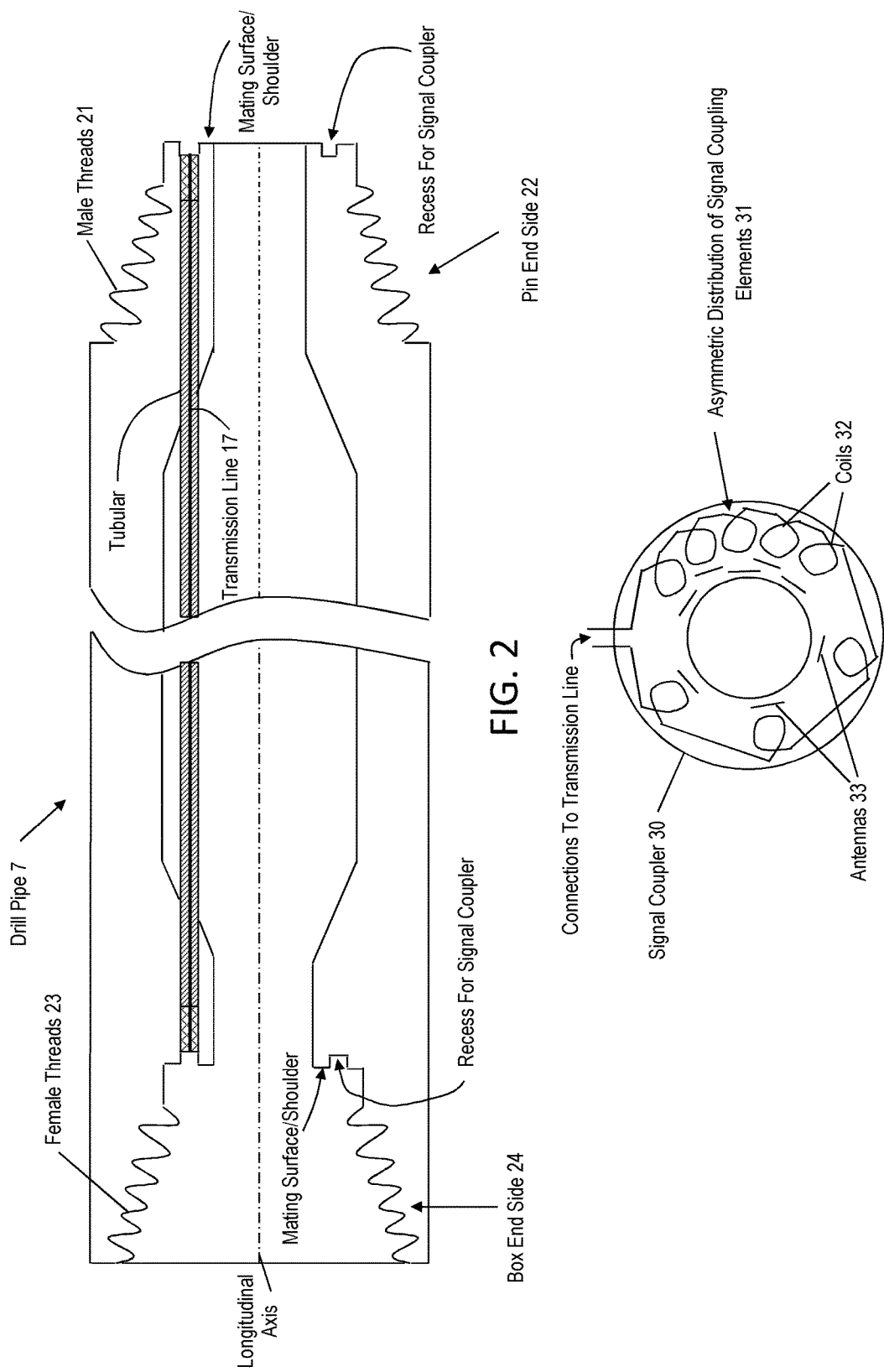

REAL TIME UNTORQUING AND OVER-TORQUING OF DRILL STRING CONNECTIONS

BACKGROUND

Boreholes are drilled into earth formations for various purposes such as hydrocarbon production, geothermal production and carbon dioxide sequestration. The boreholes are typically drilled using a drill string coupled to a drill bit. The drill string is made up of a series of drill pipes coupled together by threaded connections. As a drill rig at the surface of the earth rotates the drill string, the drill bit is also rotated to drill a borehole. Unfortunately, drill string vibrations or borehole events can cause a threaded connection between two adjacent drill pipes to either become over-torqued or become un-torqued or loosened. Over-torquing can cause damage to the threaded connection or drill pipe body. Un-torquing can cause the loosened connection to eventually become disconnected thus resulting in disconnected equipment being left in the borehole. Damaged drill pipes can be expensive to repair or replace while equipment left in the borehole may have to be abandoned in place or fished out with specialized tools resulting in expensive down time. Hence, it would be well received in the drilling industry if apparatuses and methods would be developed to identify when over-torquing or un-torquing of threaded drill pipe connections was occurring in real time.

BRIEF SUMMARY

Disclosed is an apparatus for detecting over-torquing or un-torquing of a threaded connection between components in a borehole penetrating the earth. The apparatus includes: a string of components coupled in series by a threaded connection; a transmission line attached to each component and configured to transmit a signal; a signal coupler in communication with the transmission line and disposed on each component at each threaded connection, the signal coupler being configured to transmit the signal to an adjacent signal coupler on an adjacent coupled component in order to transmit the signal along the transmission line attached to the adjacent coupled component; a receiver configured to receive the signal; and a processor in communication with the receiver and configured to: (i) determine a difference between a characteristic of the signal and the characteristic of a reference signal and (ii) transmit an alert signal signifying that the threaded connection is over-torquing or un-torquing in response to the difference exceeding a threshold value.

Also disclosed is a method for detecting over-torquing or un-torquing of a threaded connection between components in a borehole penetrating the earth. The method includes: receiving a signal using a receiver, the signal being transmitted over a transmission line attached to a string of components coupled together in series by threaded connections, wherein a signal coupler in communication with the transmission line and disposed on each component at each threaded connection is configured to transmit the signal to an adjacent signal coupler on an adjacent component in order to transmit the signal along the transmission line attached to the adjacent component; determining a difference between a characteristic of the signal and the characteristic of a reference signal using a processor; and transmitting an alert signal signifying that one of the threaded connections is over-torquing or un-torquing in response to the difference exceeding a threshold value using a processor.

BRIEF DESCRIPTION OF THE DRAWINGS

The following descriptions should not be considered limiting in any way. With reference to the accompanying drawings, like elements are numbered alike:

FIG. 2 is a cross-sectional view of an embodiment of a drill pipe;

FIG. 3 depicts aspects of a signal coupler having an asymmetric distribution of signal coupling elements;

DETAILED DESCRIPTION

A detailed description of one or more embodiments of the disclosed apparatus and method presented herein by way of exemplification and not limitation with reference to the figures.

Disclosed are embodiments of apparatuses and methods for detecting over-torquing or un-torquing a threaded connection between drill pipes in a drill string in a borehole penetrating the earth. The term "over-torquing" relates to applying more torque to the threaded connection or material in contact with the threaded connection than the threaded connection or the material was designed to withstand. The term "un-torquing" relates to the threaded connection being loosened or rotating in a direction that would eventually lead to the threaded connection being disconnected. The apparatuses and methods involve analyzing a signal transmitted uphole to the surface by a transmission line or conductor attached to the drill string. Signal couplers are used to transmit the signal across drill pipe connections. Over-torquing or un-torquing can result in a misalignment between adjacent signal couplers and thus affect a characteristic of the transmitted signal. Hence, analysis of the signal involves determining if a characteristic of the signal has changed, thus indicating that an over-torquing or un-torquing condition has occurred. The determining can be done in real time as the signal is received. Once an over-torquing or un-torquing condition has been detected, one or more actions can be taken to limit or prevent further over-torquing or un-torquing. The actions can be performed automatically by a controller or they can be performed manually by an operator receiving an alert signal.

Figure 1:
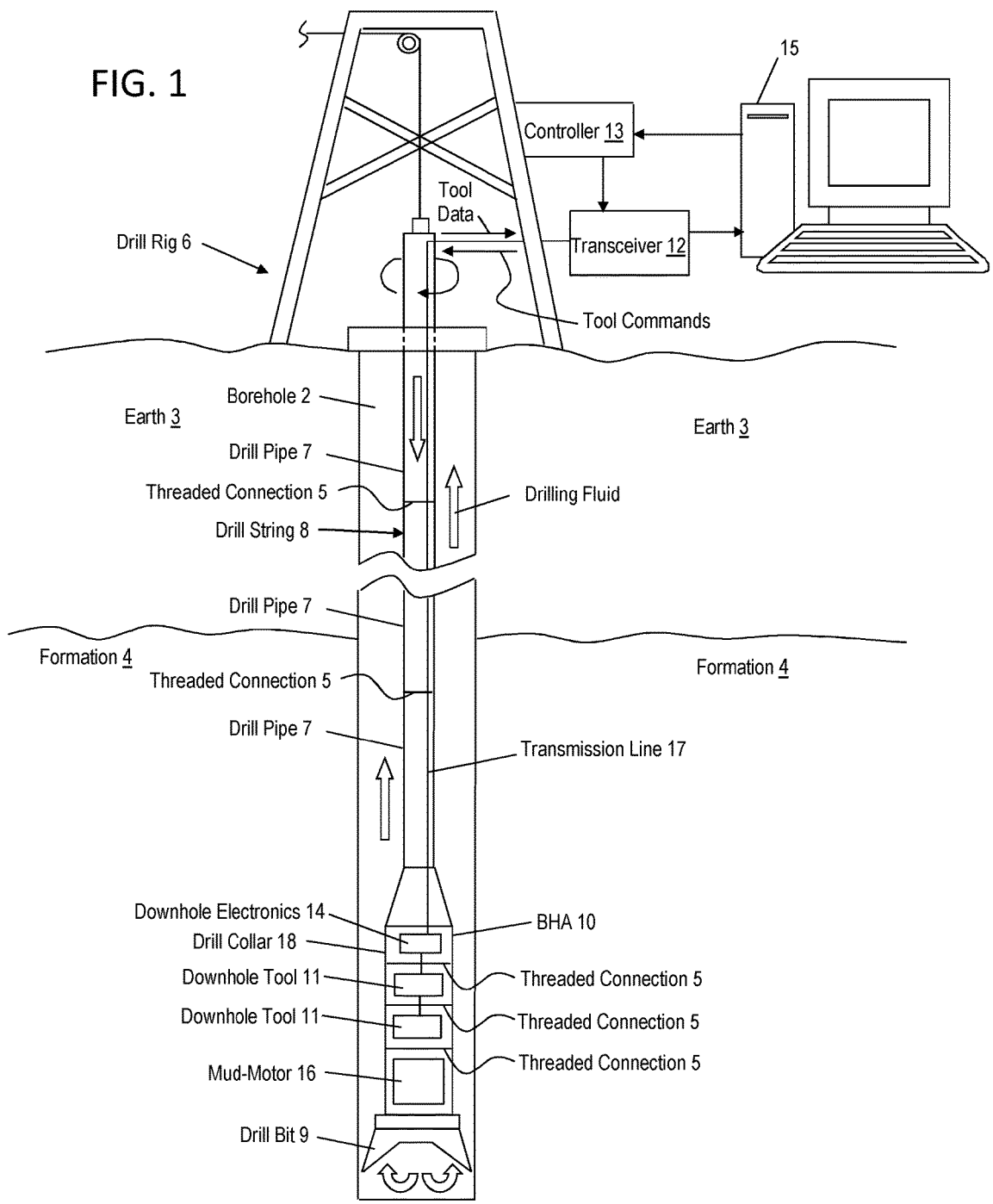
FIG. 1 is a cross-sectional view of an embodiment of a drill string coupled to a bottomhole assembly disposed in a borehole penetrating the earth.

FIG. 1 is a cross-sectional view of an embodiment of a drill string 8 and drill bit 9 disposed in a borehole penetrating the earth 3 having a formation 4. The formation 4 represents any subsurface material of interest that is being drilled. The drill string 8 is made up of a plurality of drill pipes 7 coupled in series by threaded connections 5. The drill bit 9 is coupled to the drill string 8 and is configured to cut or disintegrate rock to form the borehole 2. A bottomhole assembly (BHA) 10 is disposed at the distal end of a drill string 8. The BHA 10 may include one or more drill collars 18 that may contain tools or other components. The drill collars 18 may also be coupled together by the threaded connection 5. A drill rig 6 is configured to perform operations for drilling the borehole 2 such as rotating the drill string 8 and thus the drill bit 9 in order to drill the borehole 2. In addition, the drill rig 6 is configured to pump drilling fluid or mud through the drill tubular 8 in order to flush cuttings from the borehole 2 and lubricate the drill bit 9.

Disposed in the BHA 10 are one or more downhole tools 11. One of the downhole tools 11 may be incorporated into one drill collar 18 such that one downhole tool 11 may be coupled by the threaded connection 5 to another downhole tool 11 or to a separate drill collar 18. The downhole tools 11 are configured to perform selected functions downhole such as performing downhole logging measurements on the formation 4 or the borehole 2, setting whipstocks, performing fishing operations, or running casing or liner, as non-limiting examples. Measurement data may be transmitted to a transceiver 12 at the surface using a transmission line 17 in an embodiment referred to as wired drill pipe. Commands may be transmitted to the one or more downhole tools 11 from the transceiver 12 using the transmission line 17. Signals transmitted over the transmission line 17 may be processed downhole by downhole electronics 14, at the surface by a computer processing system 15 or by a combination of downhole and surface processing. A mud-motor 16 may also be disposed in the BHA 10. The mud-motor 16 is configured to provide further rotational force for rotating the drill bit 9. In one or more embodiments, the mud-motor 16 uses the energy of the pumped drilling fluid to provide the further rotational force. The drill rig 6 may also include a controller 13 configured to control drilling operations performed by the drill rig 6 such as controlling drilling parameters. Non-limiting embodiments of the drilling parameters include rotational speed of the drill string, torque applied to the drill string, weight-on-bit applied to the drill string, drilling fluid flow rate, and mud motor speed.

FIG. 2 is a cross-sectional view of an embodiment of one drill pipe 7. The drill pipe 7 includes male threads 21 at a pin-head side 22 and female threads 23 at a box-end side 24. The male threads 21 are configured to engage the female threads 23 on an adjacent drill pipe 7 in order to make the threaded connection 5 discussed above. The drill pipe 7 in a configuration referred to as wired drill pipe includes the transmission line 17 for transmitting electrical signals. A recess for accepting a signal coupler is disposed at each end of the drill pipe 7. The signal couplers at each end of the threaded connection 5 are configured to transmit the electrical signals from one transmission line 17, across the threaded connection 5, and then to the transmission line 17 in an adjacent drill pipe. The signal couplers signal coupling elements to transmit the electrical signals from one signal coupler to the opposing signal coupler in the adjacent drill pipe. It can be appreciated that the drill pipe 7 in FIG. 2 may be representative of other downhole components having the threaded connection 5. For example, the drill collar 18 or the downhole tool 11 may include the male threads 21, the female threads 23, and the transmission line 17. Further, the drill collar 18 or the downhole tool 11 may also include the recess for accepting the signal coupler.

FIG. 3 illustrates an embodiment of a signal coupler 30 having an asymmetric distribution of signal coupling elements 31. The signal coupling elements 31 are configured to transmit a signal from the transmission line 17 to corresponding signal coupling elements 31 on an opposing signal coupler 30 on an adjacent drill pipe or component having the threaded connection 5. The opposing signal couplers 30 and the mechanical connection 5 are configured such that when the mechanical connection 5 is made up, the opposing signal couplers 30 are in close proximity to each other and aligned so that the asymmetric distribution of signal coupling elements 31 in one signal coupler 30 is a mirror image of the asymmetric distribution of signal coupling elements 31 on the opposing signal coupler 30. The mirror image provides for an effective or maximum inductive coupling between the opposing signal couplers 30. Hence, if over-torquing or un-torquing of the threaded connection 5 occurs, then the amount of inductive coupling will decrease resulting in a decrease in the amplitude of the transmitted signal or in an amount of phase shift of the transmitted signal. In one or more embodiments, each of the signal coupling elements 31 is a coil 32 configured to inductively couple to a corresponding coil or coils 32 on the opposing signal coupler 30 on the adjacent drill pipe or component having the threaded connection 5. In one or more embodiments, each of the signal coupling elements 31 is an antenna 33 configured to transmit and receive an electromagnetic signal to or from a corresponding antenna or antennas 32 on the opposing signal coupler 30 on the adjacent drill pipe or component having the threaded connection 5. Not shown are electronic components for signal conditioning that may be used to interface between the transmission line 17 and each of the signal coupling elements 31. For example, the electronic components may provide for signal amplification or transmitting and receiving electromagnetic signals at a specified frequency that coordinates with the antennas 33.

Figure 4:
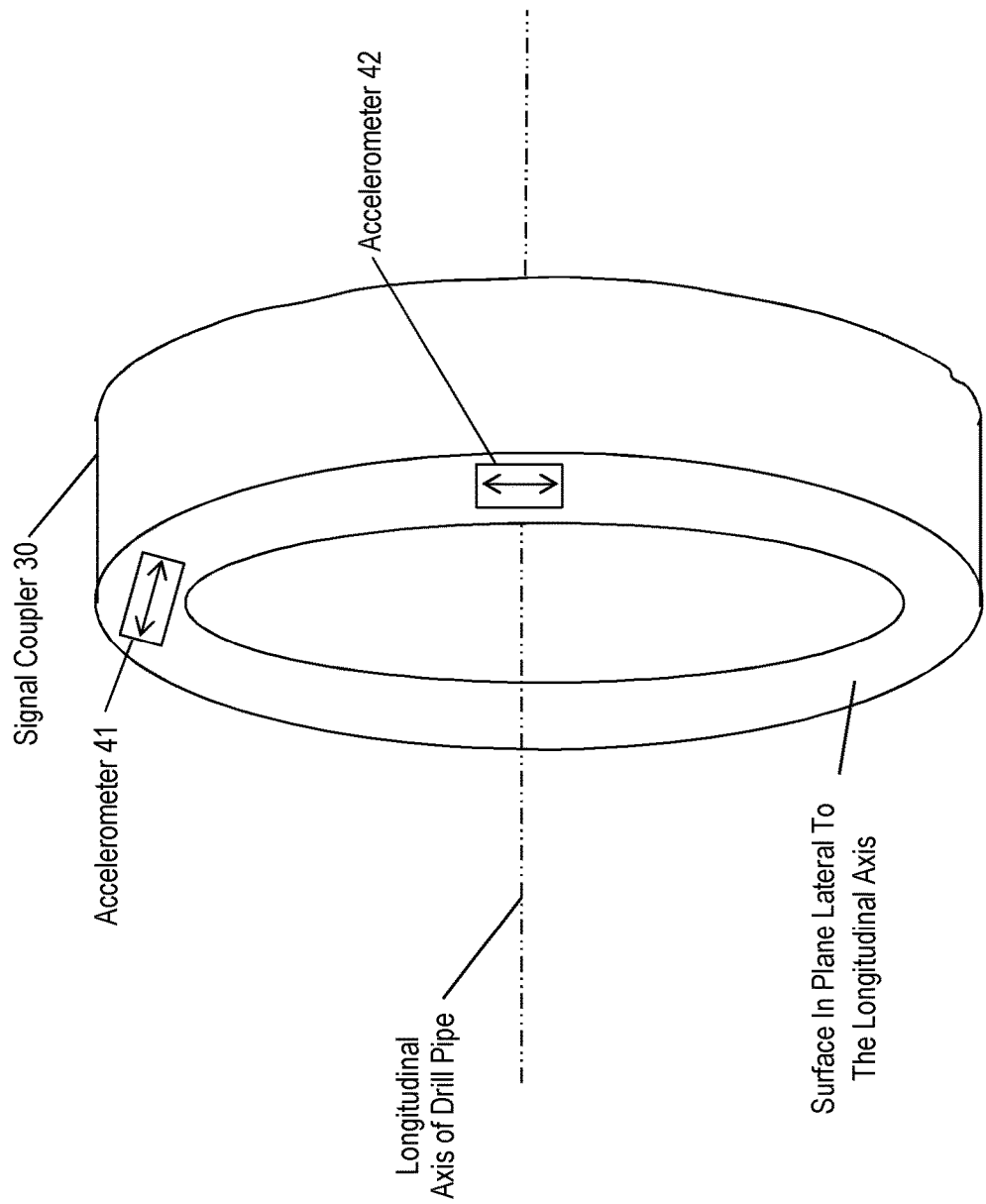
FIG. 4 depicts aspects of a two accelerometer disposed on a lateral plane of a drill pipe for sensing orthogonal accelerations.

Other signal processing techniques may also be used to detect if over-torquing or un-torquing of the threaded connection 5 occurs. These other signal processing techniques involve using one or more accelerometers disposed in close proximity to each signal coupler 30 or an end of each drill pipe 7. The one or more accelerometers may be disposed in plane lateral or perpendicular to the longitudinal axis of the drill pipe. If the signal coupler 30 is disposed in the lateral plane, then the one or more accelerometers may be disposed on the signal coupler 30. The one or more accelerometers on one side of the threaded connection are generally disposed at locations that are mirror images of locations of the one or more accelerometer disposed on the other side of the threaded connection. FIG. 4 depicts aspects of a two accelerometers 41 and 42 disposed on the signal coupler 30 in a lateral plane of the drill pipe 7. Accelerometers 41 and 42 are configured to sense acceleration or gravitational acceleration in a defined direction (see arrows). In the embodiment of FIG. 4, the accelerometers 41 and 42 are disposed so as to sense acceleration in two orthogonal directions in the lateral plane such that acceleration in any direction in that plane can be sensed. Each of the accelerometers may include electronics for communicating with the surface transceiver 12 via the transmission line 17 or may be in communication with separate electronics for communicating with the surface transceiver 12 via the transmission line 17.

In one signal processing technique, an accelerometer measurement made by one or more accelerometers on one side of the threaded connection is compared to the accelerometer measurement made by the mirror image accelerometers on the other side of the threaded connection while the drill string is rotating. If the measurement values differ by more than a defined threshold value, then that provides an indication that the corresponding threaded connection is over-torquing or un-torquing.

In another signal processing technique, an accelerometer measurement is made by one or more accelerometers on one side of the threaded connection while the drill string is not rotating and a first high side tool face angle is calculated from the accelerometer measurement with respect to a reference line. Similarly, another accelerometer measurement is made by one or more mirror image accelerometers on the other side of the threaded connection and a second high side tool face angle is also calculated from the another accelerometer measurement with respect to the reference line. The first and second high side tool face angles should be the same if no over-torquing or un-torquing of the threaded connection has occurred. However, if the difference between the first and second high side tool face angles exceeds a defined threshold value, then that provides an indication that the corresponding threaded connection is over-torquing or un-torquing.

As noted above, once an over-torquing or un-torquing condition has been detected, one or more actions can be taken to limit or prevent further over-torquing or un-torquing. In that vibrations of the drill string may cause the over-torquing or un-torquing condition, actions that decrease drill string vibrations may be taken. Decreasing vibrations may include decreasing an amplitude of vibration and/or change a frequency of vibrations so as to change the mode shape of the drill string. In one or more embodiments, the change in mode shape results in having a node (i.e., location with zero or near-zero vibration) at a problem depth. Non-limiting embodiments of the actions include: (1) changing a drilling parameter so as to lower vibrations, including amplitude and/or frequency, of the drill string, (2) stopping further drilling of the borehole, (3) pulling the drill string out of the borehole and fixing any affected threaded connection, (4) adding friction reducing chemicals into the drilling fluid, (5) placing low-friction pipe protectors around certain drill pipes on a next run of drill pipe, (6) change type of drill bit, (7) change type of threads in threaded connections, and/or (8) change BHA design.

Certain actions such as changing a drilling parameter or stopping further drilling may be performed automatically by a controller such as the controller 13. In one or more embodiments, a processor such as the computer processing system 15 performing one of the signal processing techniques will transmit an alert signal to the controller 13 upon detecting an over-torquing or un-torquing condition of a threaded connection. The controller 13 upon receiving the alert signal will initiate one or more of the above actions depending on the severity of the condition. The severity of the condition may be estimated by the calculated difference value during the signal processing where the greater the difference indicates the greater the severity.

Alternatively, certain actions may be performed manually by an operator or user upon receiving the alert signal via a user interface such as a display monitor or a printer. For example, any of the actions requiring the drill string to be removed from the borehole may be performed manually by an operator or technician upon receiving notification of a threaded connection condition.

Figure 5:
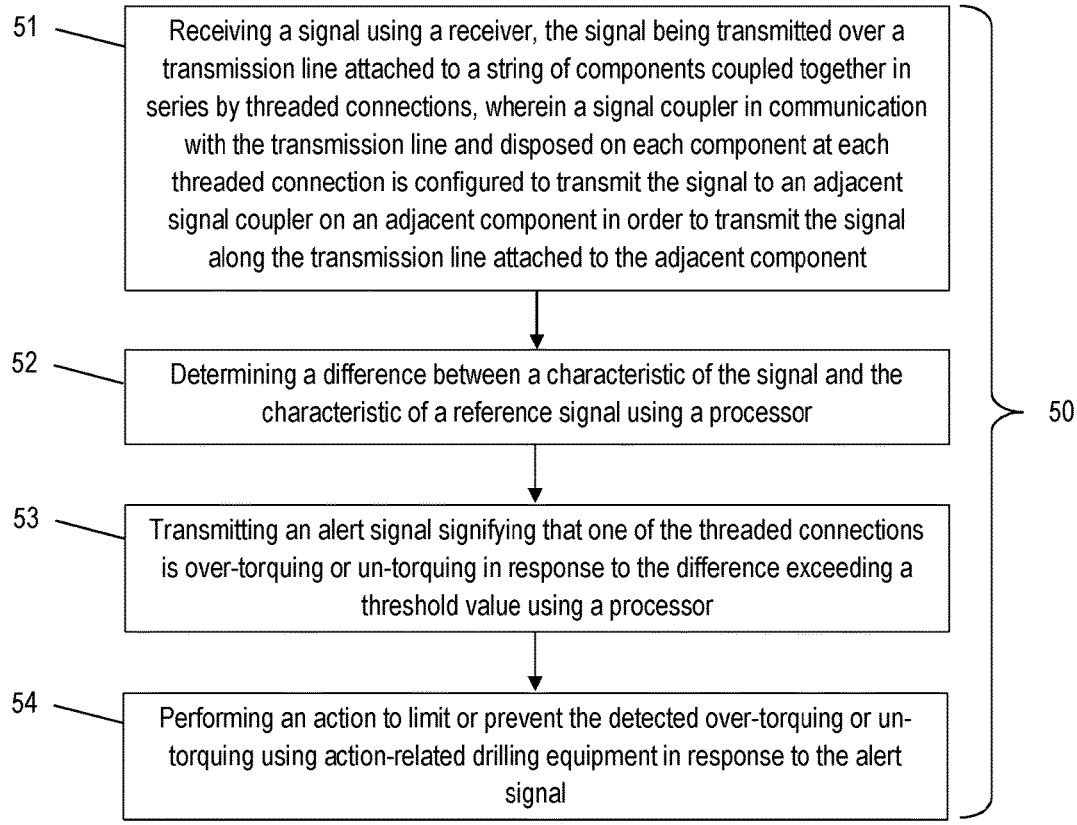
FIG. 5 is a flow chart for a method for detecting over-torquing or un-torquing a threaded connection between drill pipes in a drill string in a borehole penetrating the earth.

FIG. 5 is a flow chart for a method 50 for detecting over-torquing or un-torquing of a threaded connection between components in a borehole penetrating the earth. Block 51 calls for receiving a signal using a receiver, the signal being transmitted over a transmission line attached to a string of components coupled together in series by threaded connections, wherein a signal coupler in communication with the transmission line and disposed on each component at each threaded connection is configured to transmit the signal to an adjacent signal coupler on an adjacent component in order to transmit the signal along the transmission line attached to the adjacent component. Non-limiting embodiments of the components include a drill pipe, a drill collar, a device in a bottomhole assembly, and a downhole tool. Same types of components may be may be coupled together by the threaded connection or different types of components may be coupled together by the threaded connection. For example, a series of drill pipes may be coupled together, a drill pipe may be coupled to a drill collar, a drill collar may be coupled to a device, such as downhole tool, in a bottomhole assembly.

In one or more embodiments, the signal coupler includes an asymmetric distribution of signal coupling elements. Non-limiting embodiments of the signal coupling elements include coils for inductive coupling and/or antennas for transmitting and receiving electromagnetic signals. In one or more embodiments, the signal coupling elements on one side of the threaded connection present a mirror image of the signal coupling elements on the other side of the threaded connection.

In one or more embodiments, the signal is provided by one or more accelerometers disposed at each drill pipe and configured to measure acceleration in a defined direction in a plane lateral (i.e., perpendicular) to a longitudinal axis of the corresponding drill pipe. In one or more embodiments, the signal includes a first signal having a first measurement value of an acceleration value sensed by one accelerometer at one side of one threaded connection and the reference signal includes a second signal having a second measurement value of an acceleration sensed by one mirror-image accelerometer at the other side of the one threaded connection. In one or more embodiments, the first and second measurement values and a time at which the first and second measurement values were received or made are recorded, the first and second measurement values being made on a defined periodic basis. In one or more embodiments, the accelerometer includes a first accelerometer configured to sense acceleration in a first defined direction and a second accelerometer configured to sense acceleration in a second defined direction having at least a vector component orthogonal to the first defined direction, the signal includes first and second measurement values sensed by the corresponding first and second accelerometers at one side of one threaded connection, the reference signal includes third and fourth measurement values sensed by the corresponding first and second mirror-image accelerometers at the other side of the one threaded connection, the processor being further configured to determine a first difference between the first and third measurement values and a second difference between the second and fourth measurement values and to transmit the alert signal if the first or second differences exceeds the threshold value. In one or more embodiments, the accelerations are sensed during rotation of the drill string. In one or more embodiments, the accelerations are sensed when the drill string is not rotating.

Block 52 calls for determining a difference between a characteristic of the signal and the characteristic of a reference signal using a processor. In one or more embodiments, the characteristic is an amplitude, a phase, an acceleration value, or a high side tool face angle. In one or more embodiments, the characteristic of the reference signal includes an average value of the characteristic as determined over a selected time interval.

Block 53 calls for transmitting an alert signal signifying that one of the threaded connections is over-torquing or un-torquing in response to the difference exceeding a threshold value using a processor.

Block 54 calls for performing an action to limit or prevent the detected over-torquing or un-torquing using action-related drilling equipment in response to the alert signal.

The method 50 may also include receiving the alert signal using a controller and automatically controlling a drilling operation in response to the alert signal that limits or prevents the corresponding over-torquing or un-torquing.

The method 50 may also include receiving the alert signal using a user interface and manually performing an action that limits or prevents the corresponding over-torquing or un-torquing.

Set forth below are some embodiments of the foregoing disclosure:

Embodiment 1

An apparatus for detecting over-torquing or un-torquing of a threaded connection between components in a borehole penetrating the earth, the apparatus comprising: a string of components coupled in series by a threaded connection; a transmission line attached to each component and configured to transmit a signal; a signal coupler in communication with the transmission line and disposed on each component at each threaded connection, the signal coupler being configured to transmit the signal to an adjacent signal coupler on an adjacent coupled component in order to transmit the signal along the transmission line attached to the adjacent coupled component; a receiver configured to receive the signal; and a processor in communication with the receiver and configured to: (i) determine a difference between a characteristic of the signal and the characteristic of a reference signal and (ii) transmit an alert signal signifying that the threaded connection is over-torquing or un-torquing in response to the difference exceeding a threshold value.

Embodiment 2

The apparatus according to any prior embodiment, further comprising a controller configured to receive the alert signal and to control a drilling operation in response to the alert signal that limits or prevents the corresponding over-torquing or un-torquing.

Embodiment 3

The apparatus according to any prior embodiment, wherein the action comprises changing an operational parameter of a drill string comprising the string of components.

Embodiment 4

The apparatus according to any prior embodiment, wherein the operational parameter is at least one of rotational speed of the drill string, torque applied to the drill string, weight-on-bit applied to the drill string, drilling fluid flow rate, and mud motor speed.

Embodiment 5

The apparatus according to any prior embodiment, wherein changing an operational parameter of the drill string comprises stopping rotation of the drill string.

Embodiment 6

The apparatus according to any prior embodiment, wherein the signal coupler comprises an asymmetric distribution of signal coupling elements.

Embodiment 7

The apparatus according to any prior embodiment, wherein the asymmetric distribution of signal coupling elements comprises an asymmetric distribution of conductor coils.

Embodiment 8

The apparatus according to any prior embodiment, wherein the asymmetric distribution of signal coupling elements comprises an asymmetric distribution of antennas.

Embodiment 9

The apparatus according to any prior embodiment, wherein the characteristic of the signal comprises an amplitude of the signal and/or a phase of the signal.

Embodiment 10

The apparatus according to any prior embodiment, wherein the characteristic of the reference signal comprises an average value of the characteristic of the signal as determined over a selected time interval.

Embodiment 11

The apparatus according to any prior embodiment, wherein the string of components comprises a string of drill pipes.

Embodiment 12

The apparatus according to any prior embodiment, wherein the string of components comprises at least one component that is a drill collar, a device in a bottomhole assembly, and/or a downhole tool.

Embodiment 13

The apparatus according to any prior embodiment, further comprising an accelerometer disposed at each drill pipe and configured to measure acceleration in a defined direction in a plane lateral to a longitudinal axis of the corresponding drill pipe.

Embodiment 14

The apparatus according to any prior embodiment, wherein the signal comprises a first signal having a first measurement value of an acceleration value sensed by one accelerometer at one side of one threaded connection and the reference signal comprises a second signal having a second measurement value of an acceleration sensed by one accelerometer at the other side of the one threaded connection.

Embodiment 15

The apparatus according to any prior embodiment, wherein the accelerations are sensed during rotation of the drill string.

Embodiment 16

The apparatus according to any prior embodiment, wherein the processor is further configured to record the first and second measurement values and a time at which the first and second measurement values were received or made, the first and second measurement values being made on a defined periodic basis.

Embodiment 17

The apparatus according to any prior embodiment, wherein the processor is further configured to record the first and second measurement values and a time at which the first and second measurement values were received or made, the first and second measurement values being made on a defined periodic basis.

Embodiment 18

The apparatus according to any prior embodiment, wherein the accelerometer comprises a first accelerometer configured to sense acceleration in a first defined direction and a second accelerometer configured to sense acceleration in a second defined direction having at least a vector component orthogonal to the first defined direction, the signal comprising first and second measurement values sensed by the corresponding first and second accelerometers at one side of one threaded connection, the reference signal comprising third and fourth measurement values sensed by the corresponding first and second accelerometers at the other side of the one threaded connection, the processor being further configured to determine a first difference between the first and third measurement values and a second difference between the second and fourth measurement values and to transmit the alert signal if the first or second differences exceeds the threshold value.

Embodiment 19

A method for detecting over-torquing or un-torquing of a threaded connection between components in a borehole penetrating the earth, the method comprising: receiving a signal using a receiver, the signal being transmitted over a transmission line attached to a string of components coupled together in series by threaded connections, wherein a signal coupler in communication with the transmission line and disposed on each component at each threaded connection is configured to transmit the signal to an adjacent signal coupler on an adjacent component in order to transmit the signal along the transmission line attached to the adjacent component; determining a difference between a characteristic of the signal and the characteristic of a reference signal using a processor; and transmitting an alert signal signifying that one of the threaded connections is over-torquing or un-torquing in response to the difference exceeding a threshold value using a processor.

Embodiment 20

The method according to any prior embodiment, further comprising receiving the alert signal using a controller and controlling a drilling operation in response to the alert signal that limits or prevents the corresponding over-torquing or un-torquing.

In support of the teachings herein, various analysis components may be used, including a digital and/or an analog system. For example, the downhole tool 11, the receiver 12, the controller 13, the downhole electronics 14, the computer processing system 15, and/or the accelerometers 41 and 42 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" and the like are used to distinguish elements and are not used to denote a particular order.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for detecting over-torquing or un-torquing of a threaded connection between components in a borehole penetrating the earth, the apparatus comprising:
a string of components coupled in series by a threaded connection;
a transmission line attached to each component and configured to transmit a signal;
a signal coupler in communication with the transmission line and disposed on each component at each threaded connection, the signal coupler being configured to transmit the signal to an adjacent signal coupler on an adjacent coupled component in order to transmit the signal along the transmission line attached to the adjacent coupled component;
a receiver configured to receive the signal; and
a processor in communication with the receiver and configured to: (i) determine a difference between a characteristic of the signal and the characteristic of a reference signal and (ii) transmit an alert signal signifying that the threaded connection is over-torquing or un-torquing in response to the difference exceeding a threshold value.

2. The apparatus according to claim 1, further comprising a controller configured to receive the alert signal and to control a drilling operation in response to the alert signal that limits or prevents the corresponding over-torquing or un-torquing.

3. The apparatus according to claim 2, wherein the action comprises changing an operational parameter of a drill string comprising the string of components.

4. The apparatus according to claim 3, wherein the operational parameter is at least one of rotational speed of the drill string, torque applied to the drill string, weight-on-bit applied to the drill string, drilling fluid flow rate, and mud motor speed.

5. The apparatus according to claim 3, wherein changing an operational parameter of the drill string comprises stopping rotation of the drill string.

6. The apparatus according to claim 1, wherein the signal coupler comprises an asymmetric distribution of signal coupling elements.

7. The apparatus according to claim 6, wherein the asymmetric distribution of signal coupling elements comprises an asymmetric distribution of conductor coils.

8. The apparatus according to claim 6, wherein the asymmetric distribution of signal coupling elements comprises an asymmetric distribution of antennas.

9. The apparatus according to claim 1, wherein the characteristic of the signal comprises an amplitude of the signal and/or a phase of the signal.

10. The apparatus according to claim 9, wherein the characteristic of the reference signal comprises an average value of the characteristic of the signal as determined over a selected time interval.

11. The apparatus according to claim 1, wherein the string of components comprises a string of drill pipes.

12. The apparatus according to claim 1, wherein the string of components comprises at least one component that is a drill collar, a device in a bottomhole assembly, and/or a downhole tool.

13. The apparatus according to claim 1, further comprising an accelerometer disposed at each drill pipe and configured to measure acceleration in a defined direction in a plane lateral to a longitudinal axis of the corresponding drill pipe.

14. The apparatus according to claim 13, wherein the signal comprises a first signal having a first measurement value of an acceleration value sensed by one accelerometer at one side of one threaded connection and the reference signal comprises a second signal having a second measurement value of an acceleration sensed by one accelerometer at the other side of the one threaded connection.

15. The apparatus according to claim 14, wherein the accelerations are sensed during rotation of the drill string.

16. The apparatus according to claim 14, wherein the accelerations are sensed when the drill string is not rotating.

17. The apparatus according to claim 14, wherein the processor is further configured to record the first and second measurement values and a time at which the first and second measurement values were received or made, the first and second measurement values being made on a defined periodic basis.

18. The apparatus according to claim 13, wherein the accelerometer comprises a first accelerometer configured to sense acceleration in a first defined direction and a second accelerometer configured to sense acceleration in a second defined direction having at least a vector component orthogonal to the first defined direction, the signal comprising first and second measurement values sensed by the corresponding first and second accelerometers at one side of one threaded connection, the reference signal comprising third and fourth measurement values sensed by the corresponding first and second accelerometers at the other side of the one threaded connection, the processor being further configured to determine a first difference between the first and third measurement values and a second difference between the second and fourth measurement values and to transmit the alert signal if the first or second differences exceeds the threshold value.

19. A method for detecting over-torquing or un-torquing of a threaded connection between components in a borehole penetrating the earth, the method comprising:
receiving a signal using a receiver, the signal being transmitted over a transmission line attached to a string of components coupled together in series by threaded connections, wherein a signal coupler in communication with the transmission line and disposed on each component at each threaded connection is configured to transmit the signal to an adjacent signal coupler on an adjacent component in order to transmit the signal along the transmission line attached to the adjacent component;
determining a difference between a characteristic of the signal and the characteristic of a reference signal using a processor; and
transmitting an alert signal signifying that one of the threaded connections is over-torquing or un-torquing in response to the difference exceeding a threshold value using a processor.

20. The method according to claim 19, further comprising receiving the alert signal using a controller and controlling a drilling operation in response to the alert signal that limits or prevents the corresponding over-torquing or un-torquing.

* * * * *